(12) United States Patent
Jia et al.

(10) Patent No.: US 12,504,557 B2
(45) Date of Patent: Dec. 23, 2025

(54) SIMULATION SYSTEM AND SIMULATION METHOD FOR IN-SITU COLUMN EXPERIMENT IN GROUNDWATER WELL

(71) Applicant: CHINESE RESEARCH ACADEMY OF ENVIRONMENTAL SCIENCES, Beijing (CN)

(72) Inventors: Yongfeng Jia, Beijing (CN); Yonghai Jiang, Beijing (CN); Beidou Xi, Beijing (CN); Xinying Lian, Beijing (CN); Yu Yang, Beijing (CN); Xiangjian Xu, Beijing (CN); Fan Feng, Beijing (CN)

(73) Assignee: CHINESE RESEARCH ACADEMY OF ENVIRONMENTAL SCIENCES CHINA, Beijing (CN)

( * ) Notice: Subject to any disclaimer, the term of this patent is extended or adjusted under 35 U.S.C. 154(b) by 1059 days.

(21) Appl. No.: 17/615,273

(22) PCT Filed: May 29, 2020

(86) PCT No.: PCT/CN2020/093317
§ 371 (c)(1),
(2) Date: Apr. 28, 2022

(87) PCT Pub. No.: WO2020/239081
PCT Pub. Date: Dec. 3, 2020

(65) Prior Publication Data
US 2022/0342112 A1    Oct. 27, 2022

(30) Foreign Application Priority Data
May 30, 2019    (CN) .......................... 201910466623.0

(51) Int. Cl.
*G06F 30/00*    (2020.01)
*G01V 99/00*    (2009.01)
(Continued)

(52) U.S. Cl.
CPC .............. *G01V 99/00* (2013.01); *G06F 30/20* (2020.01); *G06F 2113/08* (2020.01)

(58) Field of Classification Search
CPC ...... G01V 99/00; G06F 30/20; G06F 2113/08
(Continued)

(56) References Cited

U.S. PATENT DOCUMENTS 5,602,296 A * 2/1997 Hughes ..................... C02F 1/70
588/317
6,356,205 B1    3/2002 Salvo et al.
(Continued)

FOREIGN PATENT DOCUMENTS

CN    203033844 U    7/2013
CN    103837449 A    6/2014
(Continued)

OTHER PUBLICATIONS

First Office Action, including Search Report, for Chinese Patent Application No. 201910466623.0, dated Mar. 3, 2020, 12 pages.
(Continued)

*Primary Examiner* — Andre Pierre Louis
(74) *Attorney, Agent, or Firm* — Westman, Champlin & Koehler, P.A.

(57) ABSTRACT

A simulation system for an in-situ column experiment in a groundwater well and a simulation method are provided. The simulation system includes: an experimental column device, a sample taking device, and a sample injection device, where solid remediation agent and/or aquifer sediment are provided within the experimental column device, and is configured to be capable of being arranged in an experimental well and located below a water level; a bottom of the experimental column device is provided with a water inlet, and a top of the experimental column device is provided with a water outlet, where the top water outlet
(Continued)

connects to the sample taking device, and the bottom water inlet connects to the sample injection device.

13 Claims, 1 Drawing Sheet

(51) Int. Cl.
  *G06F 30/20* (2020.01)
  *G06F 113/08* (2020.01)
(58) Field of Classification Search
  USPC ...................................................... 703/9, 10
  See application file for complete search history.

(56) References Cited

U.S. PATENT DOCUMENTS

| | | | |
|---|---|---|---|
| 2006/0046297 | A1 | 3/2006 | Ball |
| 2009/0242196 | A1* | 10/2009 | Pao .................... E21B 43/2401 166/57 |
| 2015/0205004 | A1* | 7/2015 | Li .......................... G01V 20/00 703/10 |
| 2022/0342112 | A1 | 10/2022 | Jia et al. |

FOREIGN PATENT DOCUMENTS

| | | | |
|---|---|---|---|
| CN | 105152393 | A | 12/2015 |
| CN | 105547962 | A | 5/2016 |
| CN | 105606511 | A | 5/2016 |
| CN | 106053297 | A | 10/2016 |
| CN | 107064463 | A | 8/2017 |
| CN | 107540128 | A | 1/2018 |
| CN | 110187059 | A | 8/2019 |
| JP | 2007256025 | A | 10/2007 |
| WO | 0033070 | A1 | 6/2000 |

OTHER PUBLICATIONS

International Search Report and Written Opinion for International Application No. PCT/CN2020/093317, dated Aug. 27, 2020.
Zhang Di, "In-situ Mobilization and Transformation of Iron Oxides-Adsorbed Arsenate in High Arsenic Groundwater," China Doctoral Dissertations Full-Text Database (Basic Sciences), No. 07, Jul. 15, 2018.
Liu Shuai et al., "Laboratory Experiment of Organic Migration in the Process of Water Spreading," Yellow River, vol. 41, No. 1, Jan. 31, 2019, pp. 75-78.
Wang Yu et al., "Analog Experiment of Remediation of Nitrate-cont Aminated Groundwater Using Micro-ecological In-situ Technique," Chinese Environmental Management, vol. 2, Jun. 30, 2009, pp. 39-40.
Ma Huiqiang et al., "Column experimental study on arsenic contained groundwater remediation using zero valent iron permeable reactive barriers," Chinese Journal of Environmental Engineering, vol. 11, No. 1, Jan. 31, 2017, pp. 33-40.
Rui Zuo et al., "In-situ study of migration and transformation of nitrogen in ground water based on continuous observations at a contaminated desert site," Journal of Contaminant Hydrology, Mar. 5, 2018, pp. 39-48.

* cited by examiner

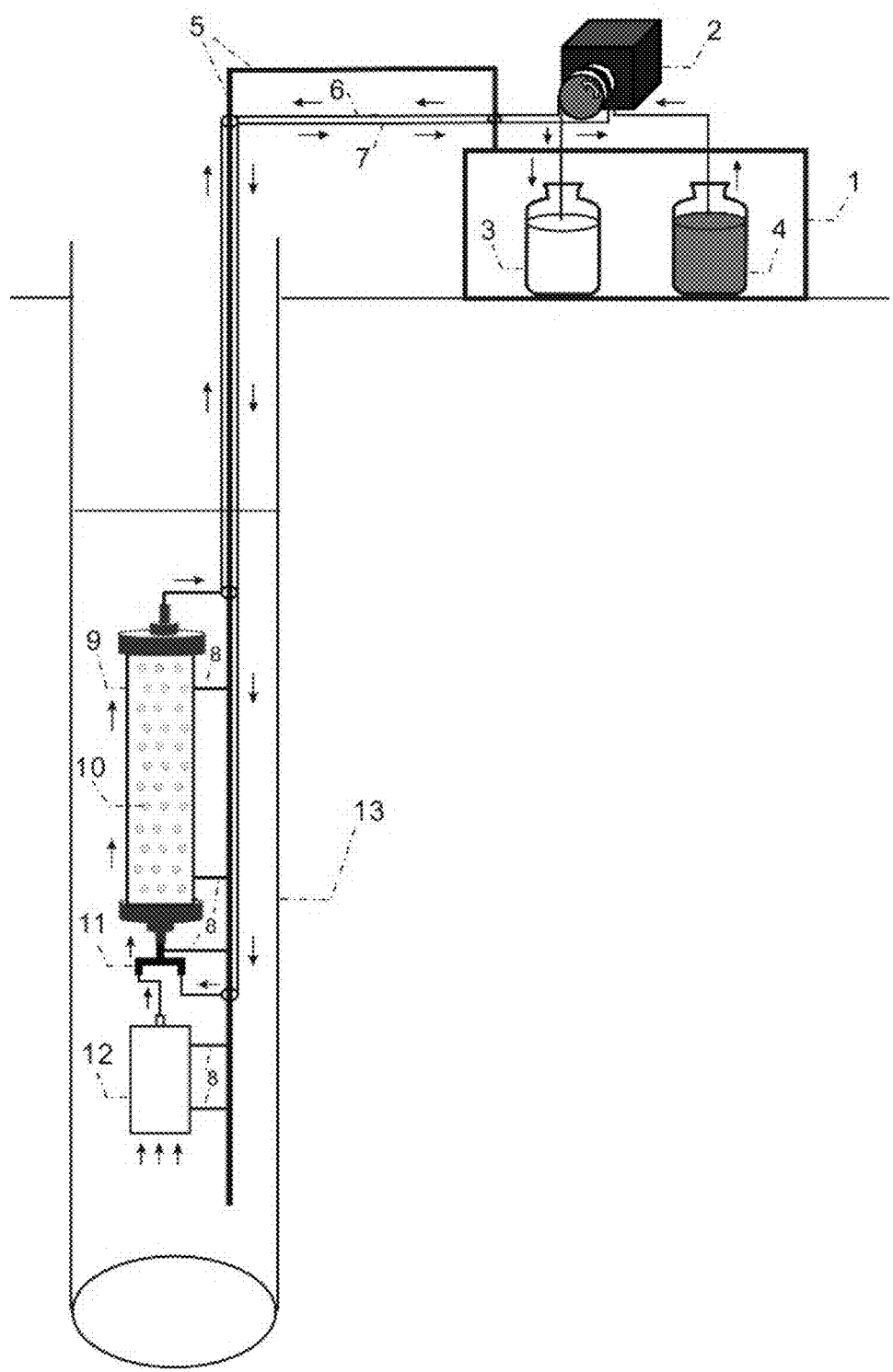

SIMULATION SYSTEM AND SIMULATION METHOD FOR IN-SITU COLUMN EXPERIMENT IN GROUNDWATER WELL

CROSS-REFERENCE TO RELATED APPLICATION

This application is a Section 371 National Stage Application of International Application No. PCT/CN2020/093317, filed on May 9, 2020, which claims priority to Chinese Patent Application No. 201910466623.0, filed on May 9, 2019, which is incorporated herein by reference in its entirety.

TECHNICAL FIELD

The present disclosure relates to the field of remediation technology for groundwater pollution, and in particular to a simulation system for an in-situ column experiment in a groundwater well and a simulation method.

BACKGROUND

Column experiments for small-scale researches are generally used in researches on pollutants migration and transformation in aquifer and groundwater pollution remediation. By injecting a pollutant into column filled with sediment, characteristics of migration and degradation of the pollutant in groundwater could be simulated. By adding a solid remediation agent to an experimental column injected with the pollutant, it is possible to study removal effects of the remediation agent on the pollutant and factors affecting the removal. However, for groundwater, the indoor column experimental conditions are obviously different from actual environmental conditions, since on the one hand, the underground environment is a dark environment with constant temperature, and on the other hand, there are obvious differences between various water chemical components and microbial community structures of the groundwater and those of the indoor experimental water. Accordingly, the existing indoor column experimental researches may not truly reflect the conditions of the groundwater in the field, which may have a significant impact on the experimental results, causing the characteristics of element migration and the characteristics of pollutant degradation to be inconsistent with the actual situations. As a result, it is usually necessary to carry out other in-situ experiments in the field for verification.

SUMMARY

In view of this, the present disclosure provides a simulation system for an in-situ column experiment in a groundwater well and a simulation method.

Specifically, as one aspect of the present disclosure, a simulation system for an in-situ column experiment in a groundwater well is provided, including: an experimental column device, a sample taking device, and a sample injection device, where a solid remediation agent and/or aquifer sediment are provided within the experimental column device, and the experimental column device is configured to be capable of being arranged in an experimental well and below a water level; a bottom of the experimental column device is provided with a water inlet, and a top of the experimental column device is provided with a water outlet, where the top water outlet is connected to the sample taking device, and the bottom water inlet is connected to the sample injection device.

As another aspect of the present disclosure, a simulation method is further provided, including the following steps:

S1: submerging, by well water of the experimental well, an underground part of the installed simulation system for an in-situ column experiment;

S2: injecting, by the underground sample injection unit, the groundwater into the experimental column device in situ filled with aquifer sediment or/and solid remediation agent, or injecting, by the overground sample injection unit, the aqueous remediation agent or an experimental pollutant solution into the experimental column device; and S3: taking a sample from the top of the experimental column device for testing and analyzing.

BRIEF DESCRIPTION OF THE DRAWINGS

FIGURE is a schematic structural diagram of a simulation apparatus for an in-situ column experiment according to an embodiment of the present disclosure.

REFERENCE NUMERALS

1—supporting base; 2—peristaltic pump; 3—sample taking bottle; 4—sample injection bottle; 5—supporting rod; 6—sample injection pipe; 7—sample taking pipe; 8—fixing rod; 9—experimental column; 10—solid remediation agent or aquifer sediment; 11—three-way valve; 12—submersible pump; 13—experimental well.

DETAILED DESCRIPTION OF EMBODIMENTS

The present disclosure discloses a simulation system for an in-situ column experiment in a groundwater well, including an experimental column device, a sample taking device, and a sample injection device.

The solid remediation agent and/or aquifer sediment are provided within the experimental column device, and the experimental column device is configured to be capable of being arranged in an experimental well and below a water level. A bottom of the experimental column device is provided with a water inlet, and a top of the experimental column device is provided with a water outlet, where the top water outlet is connected to the sample taking device, and the bottom water inlet is connected to the sample injection device.

In some embodiments of the present disclosure, the sample injection device includes an underground sample injection unit for in-situ sample taking, where the underground sample injection unit is in communication with groundwater in the experimental well and is configured to take a sample of the groundwater in the experimental well in situ; and/or the sample injection device includes an overground sample injection unit configured to add a pollutant or an aqueous remediation agent, where the overground sample injection unit is arranged on the ground and is connected to the water inlet at the bottom of the experimental column device through a sample injection pipe.

In some embodiments of the present disclosure, the bottom of the experimental column device is connected to each of the underground sample injection unit and the overground sample injection unit through a three-way valve.

In some embodiments of the present disclosure, the underground sample injection unit includes a submersible pump connected to the bottom of the experimental column device.

In some embodiments of the present disclosure, the overground sample injection unit includes a sample injection bottle, and a sample injection peristaltic pump connected to the sample injection bottle.

In some embodiments of the present disclosure, the sample taking device is arranged on the ground and is connected to the water outlet on the top of the experimental column device through a sample taking pipe.

In some embodiments of the present disclosure, the simulation system for an in-situ column experiment further includes a supporting base fixed on the ground, and the supporting base is configured to support the sample injection device, the sample taking device and/or the experimental column device.

In some embodiments of the present disclosure, the experimental column device is connected to the support base through a supporting rod body and a fixing rod fixed to the supporting rod body.

In some embodiments of the present disclosure, the supporting rod body is formed by a plurality of supporting rods that are detachably connected end to end.

In some embodiments of the present disclosure, the supporting rod body is provided with a groove, and the sample injection pipe of the sample injection device, the sample taking pipe of the sample taking device, and a power transmission line of the sample taking device are placed in the groove.

In some embodiments of the present disclosure, the experimental column device includes one experimental column, or a combination of a plurality of experimental columns connected in series or connected in parallel.

In some embodiments of the present disclosure, the sample taking device includes a sample taking bottle, and a sample taking peristaltic pump connected to the sample taking bottle.

The present disclosure further discloses a simulation method for conducting a groundwater in-situ experiment by using the simulation system for an in-situ column experiment described above. The simulation method includes the following steps.

S1: an underground part of the installed simulation system for an in-situ column experiment is submerged by well water of the experimental well;

S2: the groundwater is injected into the experimental column device in situ by the underground sample injection unit, or the aqueous remediation agent or an experimental pollutant solution is injected into the experimental column device by the overground sample injection unit; and S3: a sample is taken from the top of the experimental column device for testing and analyzing.

In some embodiments of the present disclosure, in step S1, a distance between a bottom of the simulation system for an in-situ column experiment and a bottom of the experimental well is 1 m to 2 m.

In some embodiments of the present disclosure, a flow velocity at which the sample is taken in step S3 is greater than a flow velocity at which a sample is injected in step S2.

In some embodiments of the present disclosure, in step S2, a flow velocity of the underground sample injection unit at which a sample is injected is 0.1 L/min to 0.3 L/min.

In an embodiment of the present disclosure, for example, the following technical solution is adopted. A simulation apparatus for an in-situ column experiment in a groundwater well includes a submersible pump submerged in the experimental well, an experimental column, and a sample injection pipe and a sample taking pipe that are connected to the experimental column. An overground part of the simulation apparatus is a supporting base, on which the peristaltic pump, the sample taking bottle and the sample injection bottle are arranged. The overground part and an underground part of the simulation apparatus are connected through a supporting rod, and the sample injection pipe and the sample taking pipe enter the ground together with the supporting rod, to be connected to the experimental column.

In a preferred embodiment, the present disclosure adopts, for example, the following technical solution.

A simulation apparatus for an in-situ column experiment in a groundwater well includes: a submersible pump submerged in the well, an experimental column, a sample injection pipe and a sample taking pipe;

an overground part of the simulation apparatus is provided with a supporting base, on which a peristaltic pump, a sample taking bottle, and a sample injection bottle are arranged;

a supporting rod used to connect the overground part and an underground part of the apparatus.

Here, the experimental column, the submersible pump, and a three-way valve are connected with a supporting rod body through a fixing rod.

Here, the experimental column and the submersible pump are connected through two ports of the three-way valve.

Here, the sample injection pipe and the sample taking pipe are arranged underground along with the supporting rod body, and the sample injection bottle, the peristaltic pump, and a third port of the three-way valve are connected through the sample injection pipe.

Here, a top outlet of the experimental column, the peristaltic pump, and the sample taking bottle are connected through the sample taking pipe.

Here, components of the apparatus within the well are connected to the supporting base on the ground through the supporting rod body.

Here, the supporting rod body adopts a segmented structure, with segments connected to each other through screw ports, which is convenient to install supporting rods of different lengths according to needs, and is also conducive to transportation and storage.

Here, a groove is provided on the outside of the supporting rod body for accommodating the sample injection pipe, the sample taking pipe, and a power transmission line of the sample injection system and a power transmission line of the sample taking system.

Here, places for the sample injection bottle and the sample taking bottle are arranged in an internal cavity of the supporting base.

Here, a place for the peristaltic pump is arranged on a surface of the supporting base, and the sample injection pipe and the sample taking pipe are connected to the sample taking bottle and the sample injection bottle placed in the cavity through holes on the surface.

An experimental control method using the above-mentioned simulation apparatus for in-situ column experiment provided by the present disclosure is as follows.

By placing aquifer sediment in the experimental column and a target pollutant in the sample injection bottle, the migration and transformation characteristics of the pollutant in the aquifer may be simulated. By controlling a sample injection rate of the peristaltic pump and a pumping rate of the submersible pump, the migration and transformation characteristics of the pollutant under conditions of different groundwater flow velocities could be simulated.

By placing the solid remediation agent in the experimental column and the target pollutant in the sample injection bottle, and by controlling the sample injection rate of the peristaltic pump and the pumping rate of the submersible pump, the removal ability and degradation ability of the remediation agent to the pollutant under in-situ conditions may be simulated.

By placing the solid remediation agent in the experimental column and another aqueous remediation agent in the sample injection bottle, components of the pollutant in the groundwater are directly targeted, and by controlling the sample injection rate of the peristaltic pump and the pumping rate of the submersible pump, the effects of multiple agents collaboratively remediating the groundwater could be simulated.

The present disclosure will be described in detail below with reference to the drawings. As shown in FIGURE, the simulation system for an in-situ column experiment in a groundwater well of the present disclosure may be used as a simulation system of groundwater in-situ environmental effects and remediation and treatment experimental column. The simulation system includes an overground supporting base 1 (namely, the supporting base), a supporting rod body 5, a sample injection bottle 4 (namely, the overground sample injection unit), a sample taking bottle 3, a submersible pump 12 with adjustable flow velocity (namely, the underground sample injection unit), an experimental column 9 (namely, the experimental column device), a three-way valve 11, and other parts.

Specifically, a supporting rod body 5 is placed in the experimental well 13, and the experimental column 9, the three-way valve 11, and the submersible pump 12 at a low flow velocity are fixed onto the supporting rod body 5 through fixing rods 8. The bottom water inlet of the experimental column 9 containing the solid remediation agent and the aquifer sediment 10 is connected to the overground sample injection pipe 6 and the submersible pump 12 through the three-way valve 11, and the water outlet of the experimental column 9 is connected to the overground sample taking pipe 7. The sample injection pipe 6 and the sample taking pipe 7 are connected to the peristaltic pump 2 from opposite directions, and then are respectively introduced to the sample injection bottle 4 and the sample taking bottle 3. The sample injection bottle 4 and the sample taking bottle 3 are arranged within the overground supporting base 1, the peristaltic pump 2 is fixed onto the surface of the surface supporting base 1, and the supporting rod body 5 connects the overground supporting base 1 with the submerged experimental column 9, the three-way valve 11, and the submersible pump 12 with adjustable flow velocity.

When the apparatus is in operation, all the underground experimental components are submerged to be below a surface of the groundwater, and are placed 1 m to 2 m away from the bottom of the experimental well 13 as much as possible, so as to prevent sediments deposited at the bottom from affecting a turbidity of the water and the experimental effects.

When research on the migration and transformation characteristics of a pollutant in a migration process of the aquifer is conducted, the pollutant added to the sample injection bottle 4 enters the experimental column 9 together with groundwater pumped by the submersible pump 12; or when the target pollutant is originally present in the groundwater, the pollutant does not need to be injected from the sample injection bottle 4, and only the groundwater pumped by the submersible pump 12 is injected into the experiment column 9; the sample injected by the sample injection system enters the aquifer sediment in the experiment column 9 through the three-way valve 11. Experimental samples at different times are taken for analyzing and testing through the sample taking bottle 3 on the ground, to study the migration and transformation principles of the pollutant in the aquifer sediment under in-situ conditions.

When to verify the remediation effects of the remediation agent, the solid remediation agent is put into the experimental column 9, and the other aqueous remediation agent may be put into the sample injection bottle 4; or when the target pollutant is not present in the groundwater, the target pollutant may also be added in injection bottle 4. When a plurality of remediation agents are present, a design of series connection or parallel connection may also be applied to experimental columns 9 according to actual conditions.

In this embodiment, a submersible pump 12 with adjustable flow velocity is used, where the flow velocity is generally set to 0.1 L/min to 0.3 L/min. The flow velocity of the peristaltic pump is set to be slightly greater than the flow velocity of the submersible pump, to ensure a smooth circulation of the overall inlet and outlet pipes.

For the above specific embodiments, the simulation system for an in-situ column experiment in the groundwater well and the simulation method may have at least one of the following advantages.

1. In the present disclosure, a core component (namely, the experimental column) of the simulation apparatus for in-situ column experiment is directly submerged into the groundwater environment, which may maintain the darkness and temperature conditions of the groundwater environment while directly take the undisturbed groundwater, so that chemical components and microbial components of the groundwater are maintained. Accordingly, impacts of various in-situ conditions on experimental results may be comprehensively considered to ensure actual reliabilities of the simulation of process and the remediation effects.

2. The present disclosure may effectively solve that conditions of temperature, light, microorganisms, and water chemistry of the indoor column experiment are inconsistent with those of the groundwater environment. On the one hand, the migration and transformation characteristics of the pollutant in the groundwater system may be truly simulated, and on the other hand, the applicability of the groundwater remediation agent under in-situ conditions of the groundwater may be inspected in the field, which has a wide range of application prospects and values for the research on pollutant migration and transformation in the groundwater and the pollution remediation and treatment.

3. The present disclosure may simulate the migration and transformation characteristics of the pollutant in the aquifer by placing the aquifer sediment in the experimental column and the target pollutant in the sample injection bottle. By controlling the sample injection rate of the peristaltic pump and the pumping rate (0.1 L/min to 0.3 L/min) of the submersible pump with low flow velocity, the migration and transformation characteristics of the pollutant under conditions of different groundwater flow velocities may be simulated.

4. In the present disclosure, by placing the solid remediation agent in the experimental column and the target pollutant in the sample injection bottle, and by controlling the sample injection rate of the peristaltic pump and the pumping rate of the submersible pump with low flow velocity, the removal ability and degradation ability of the remediation agent to the pollutant under the in-situ conditions may be simulated.

5. In the present disclosure, when the pollutants in the groundwater are originally present, by placing the solid remediation agent in the experimental column and the other aqueous remediation agent in the sample injection bottle, and by controlling the sample injection rate of the peristaltic pump and the pumping rate of the submersible pump with low flow velocity, the effect of multiple agents collaboratively remediating the groundwater may be simulated.

6. The present disclosure effectively solves key problems such as significant differences between the simulated conditions of the indoor column experiment and the groundwater environment, and the inability to ensure that the injected water quality is consistent with the underground in-situ water quality. The simulation apparatus of groundwater in-situ environmental effect and remediation and treatment experimental column achieves in-situ environmental conditions of the groundwater in the experimental system, and the migration and transformation of pollutant in the groundwater, and the actual remediation effects of the remediation agent may be truly simulated.

The specific embodiments described above further describe the purpose, technical solutions and beneficial effects of the present disclosure in further detail. It should be understood that the above descriptions are only specific embodiments of the present disclosure, and are not intended to limit the present disclosure. Any modification, equivalent replacement, improvement, etc., made within the spirit and the principle of the present disclosure shall be included in the protection scope of the present disclosure.

What is claimed is:

1. A simulation system for an in-situ column experiment in a groundwater well, comprising:
    an experimental column device, a sample taking device, and a sample injection device,
    wherein a solid remediation agent and aquifer sediment are provided within the experimental column device, and the experimental column device is arranged in an experimental well and below a water level;
    a bottom of the experimental column device is provided with a water inlet, and a top of the experimental column device is provided with a water outlet, wherein the top water outlet is connected to the sample taking device, and the bottom water inlet is connected to the sample injection device,
    wherein the sample injection device comprises an underground sample injection unit for in-situ sample taking, wherein the underground sample injection unit is in communication with groundwater in the experimental well and take a sample of the groundwater in the experimental well in situ, and the sample injection device comprises an overground sample injection unit to add a pollutant or a remediation agent, wherein the overground sample injection unit is arranged on the ground and is connected to the water inlet at the bottom of the experimental column subm device through a sample injection pipe to perform the following:
    S1: submerging, by well water of the experimental well, an underground part of the simulation system to perform an in-situ column experiment;
    S2: injecting, by the underground sample injection unit, the groundwater into the experimental column device in situ, or injecting, by the overground sample injection unit, the remediation agent or an experimental pollutant solution into the experimental column device; and
    S3: taking a sample from the top of the experimental column device for testing and analyzing said sample.

2. The simulation system for an in-situ column experiment according to claim 1, wherein the bottom of the experimental column device is connected to the underground sample injection unit and the overground sample injection unit through a three-way valve.

3. The simulation system for an in-situ column experiment according to claim 1, wherein the underground sample injection unit comprise a submersible pump connected to the bottom of the experimental column device; and the overground sample injection unit comprises a sample injection bottle, and a sample injection peristaltic pump connected to the sample injection bottle.

4. The simulation system for an in-situ column experiment according to claim 1, wherein the sample taking device is arranged on the ground and is connected to the water outlet on the top of the experimental column device through a sample taking pipe.

5. The simulation system for an in-situ column experiment according to claim 1, wherein the simulation system for an in-situ column experiment further comprises a supporting base fixed on the ground, and the supporting base is configured to support the sample injection device, the sample taking device and/or the experimental column device.

6. The simulation system for an in-situ column experiment according to claim 5, wherein the experimental column device is connected to the support base through a supporting rod body and a fixing rod fixed to the supporting rod body.

7. The simulation system for an in-situ column experiment according to claim 6, wherein the supporting rod body is formed by a plurality of supporting rods detachably connected end to end.

8. The simulation system for an in-situ column experiment according to claim 6, wherein the supporting rod body is provided with a groove, and the sample injection pipe of the sample injection device, the sample taking pipe of the sample taking device, and a power transmission line of the sample taking device are placed in the groove.

9. The simulation system for an in-situ column experiment according to claim 1, wherein the experimental column device comprises one experimental column, or a combination of a plurality of experimental columns connected in series or connected in parallel.

10. The simulation system for an in-situ column experiment according to claim 1, wherein the sample taking device comprises a sample taking bottle, and a sample taking peristaltic pump connected to the sample taking bottle.

11. The simulation system according to claim 1, wherein a distance between a bottom of the simulation system for an in-situ column experiment and a bottom of the experimental well is 1 m to 2 m in step S1.

12. The simulation system according to claim 1, wherein a flow velocity at which the sample is taken in step S3 is greater than a flow velocity at which a sample is injected in step S2.

13. The simulation system according to claim 1, wherein a flow velocity of the underground sample injection unit at which a sample is injected is 0.1 L/min to 0.3 L/min in step S2.

* * * * *